FIG. 2a — SCR(3)
FIG. 2b — SCR(11)
FIG. 2c — SCR(8)
FIG. 2d — SCR(15)
FIG. 2e — SCR(17)
FIG. 2f — SCR(16)
FIG. 2g — SCR(18)

NAGATAKA SEKI &
AKIO HIRATA,
INVENTORS

SCR(3)
  SCR(11)
  SCR(8)
 A B

SCR(3)
  SCR(11)
  SCR(8)
  SCR(15)
  SCR(17)
  SCR(16)
  SCR(18)

 FIG.7a SCR(3)
 FIG.7b SCR(8)
 FIG.7c SCR(11)
 FIG.7d SCR(15)
 FIG.7e SCR(17)
 FIG.7f SCR(16)
 FIG.7g SCR(18)
FIG. 8
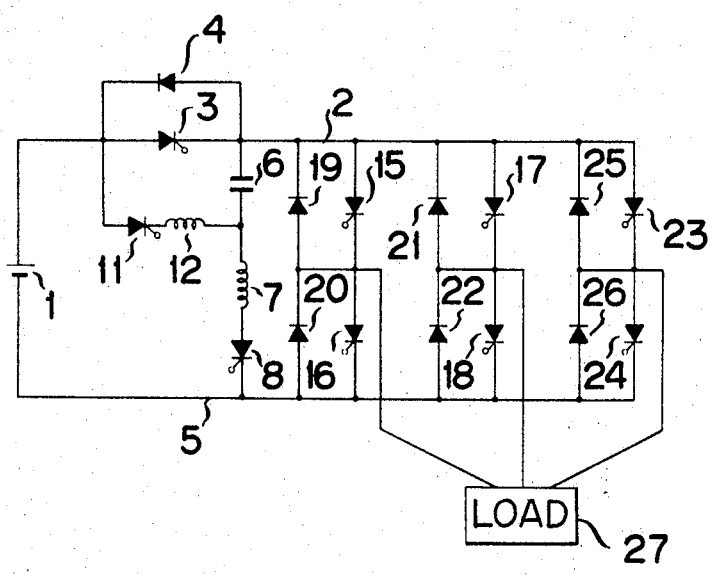

United States Patent Office 3,538,419
Patented Nov. 3, 1970

3,538,419
INVERTER DEVICE
Nagataka Seki and Akio Hirata, Tokyo, Japan, assignors to Tokyo Shibaura Electric Co., Ltd., Kawasaki-shi, Japan, a corporation of Japan
Filed Mar. 20, 1969, Ser. No. 808,792
Claims priority, application Japan, Mar. 25, 1968, 43/19,091; Mar. 28, 1968, 43/19,959; Mar. 11, 1969, 44/18,192
Int. Cl. H02m 7/52
U.S. Cl. 321—45  15 Claims

ABSTRACT OF THE DISCLOSURE

A self-excitation type inverter device wherein the commutation circuit comprises a first thyristor serially connected between a current inverting circuit consisting of a plurality of main thyristors so arranged as to supply an alternatively inverted electric current to a load circuit and one terminal of a D.C. power source, a diode connected across the first thyristor in inverse parallel relationship, a series circuit comprising a second thyristor disposed in the forward direction of the first thyristor, a first reactor and condenser and connected parallel to the first thyristor, and a second reactor and a third thyristor serially connected between the contact point of the condenser with the first reactor and the other terminal of the D.C. power source.

---

The present invention relates to an inverter device having an improved commutation circuit.

As is well known, a self-excitation type inverter device, which has an electric current inverting circuit consisting of a plurality of main thyristors so arranged as to supply to a load circuit an alternating electric current changed from a unidirectional current source, is so designed that the discharge of the charged energy accumulated in the condenser installed in the device causes a current to be commutated through the thyristors. Generally, the principal part of the commutation circuit supplying commutation energy to the main thyristors is an oscillation circuit consisting of the aforementioned condenser and a reactor. However, the conventional inverter device of such arrangement has the drawback that since the oscillating current generated by the discharge of the condenser involved in the commutation circuit passes through the main thyristors, they should have a large current capacity, with the resultant high cost of an inverter device as a whole.

Inverter devices, for example, "McMurray-Bedford Circuit" by F. W. Gutzwiller et al.: "Silicon Controlled Rectifier Manual" published by General Electric, 3rd edition, 1964, pp. 161–162, generally involve a bridge connection circuit. However, such bridge connection circuit has the shortcomings that part of the commutation energy generated by the discharge of the commutation condenser is diverted into the short circuit of the aforesaid reactor by the thyristors conducted for commutation and consumed in waste with the resultant large commutation loss.

The greater the load current passing through the main thyristors, the larger is the requirement of commutation energy. Accordingly, where an induction motor, for example, is used as a load, the condenser should have a sufficient capacity to obtain a large commutation energy in order to prevent failure of commutation at the time of start when there flows a great current. However, an unduly large condenser capacity would reduce commutation efficiency at normal operation and prolong a commutation period, leading to failure of commutation in a region of high frequency.

To eliminate such drawbacks, it has been proposed to plan the increase of commutation energy by reducing a condenser capacity and by elevating the voltage of a D.C. power source. However, the increased voltage of a D.C. power source will obstruct the low voltage operation of an inverter device as a whole or the control of variations in a power source. Particularly where it is desired to control the frequency of an A.C. power supplied to an A.C. motor, it will become necessary to vary the D.C. source voltage according to its frequency, obviously presenting the aforementioned difficulties.

It is accordingly an object of the present invention to provide an inverter device capable of unfailingly carrying out commutation by a commutation condenser having a relatively small capacity without supplying the high voltage of a D.C. power source.

Another object of the invention is to provide an inexpensive inverter device capable of commutating the main thyristors without allowing the oscillating current generated by the discharge of a condenser involved in a commutation circuit to pass through the main thyristors, thus only requiring them to have the current capacity depending on the load current.

Still another object of the invention is to provide an inverter device capable of effectively utilising the energy accumulated in a commutation condenser, thereby minimising commutation loss.

A further object of the invention is to provide an inverter device enabling the commutation time to be shortened and the upper limit to an output frequency to be raised.

Other and further objects and advantages of the present invention will be apparent from the following description when taken in connection with the accompanying drawings, in which:

FIG. 1 is a circuit diagram of an inverter device according to an embodiment of the present invention;

FIGS. 2a to 2g, FIGS. 3a to 3c and FIGS. 4a to 4g respectively present the waveforms of the current passing through the thyristors illustrating the operation of the embodiment of FIG. 1;

FIGS. 7a to 7g are the waveforms of the current passing through the thyristors illustrating the embodiment of FIG. 6;

FIG. 8 is a circuit diagram of a 3-phase inverter involving the device of FIG. 6;

Figure 1:
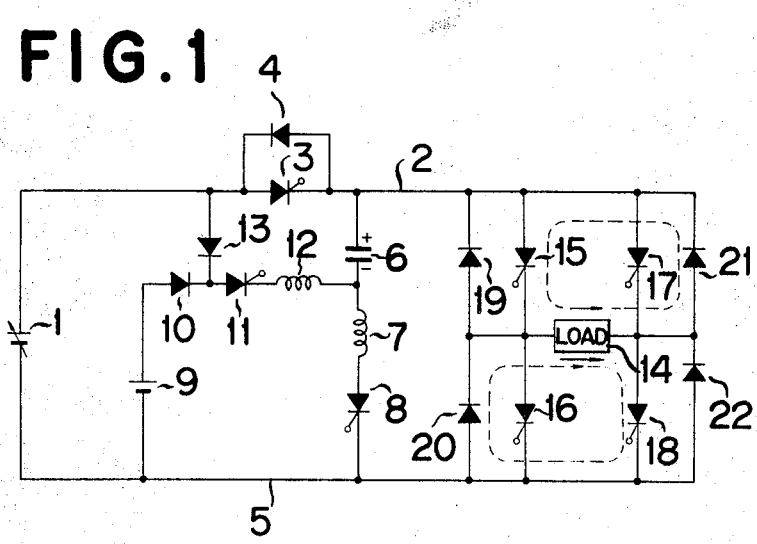

There will now be described an embodiment of the present invention by reference to FIG. 1. This figure shows a single-phase inverter using the device of the present invention. Numeral 1 is a D.C. source of variable voltage being varied according to the required load. The D.C. source 1 may be operated at a constant voltage. The positive terminal of the D.C. source 1 is connected to the positive control bus 2 of the later described commutation circuit through a thyristor 3 of the indicated polarity and a diode 4 connected parallel thereto in opposite polarity. The negative terminal of the D.C. source 1 is connected to the negative control bus 5 of said commutation circuit. Because the buses 2 and 5 there is formed a series circuit consisting of a commutation condenser 6, commutation reactor 7 and commutation thyristor 8 of indicated polarity. Numeral 9 denotes a supplementary commutation D.C. source whose negative terminal is connected to the negative side of the D.C. source 1. The positive terminal of this supplementary D.C. source 9 is connected to the connecting point of the commutation condenser 6 and commutation reactor 7, through a series circuit consisting of a commutation reactor 12, a thyristor 11 of indicated polarity, and a diode 10 of indicated polarity. Between the positive terminal of the D.C. source 1 and the common contact point of the diode 10 and thyristor 11 is disposed a diode 13 of indicated polarity. A circuit arranged as described above is used in turning off the main thyristors involved in the later described current inverting circuit.

Further between the buses 2 and 5 is positioned the inverting circuit. Namely, between the buses 2 and 5 are provided a series circuit of main thyristors 15 and 16 of indicated polarity and that of main thyristors 17 and 18, and further between the cathodes of the main thyristors 15 and 17 is interposed the load circuit 14. To the thyristors 15 to 18 are connected feed back diodes 19 to 22 respectively in inverse parallel relationship.

There will now be described the operation of an inverter device of the aforementioned arrangement. At the start of the inverter device when the commutation condenser 6 is not yet charged, the thyristors 3 and 8 are ignited to charge said condenser 6 to the indicated polarity using the D.C. source 1. Further, the main thyristors 15 and 18 are supplied with ignition signals for conduction so as to allow a current to be introduced into the load circuit 14 in the direction of the indicated arrow. After completion of the charging of the commutation condenser 6, the thyristor 8 extinguishes itself. Under such condition the thyristor 11 is ignited at predetermined instance, then the charge of the commutation condenser 6 is released through a route of thyristor 3–diode 13–thyristor 11–communtation reactor 12–condenser 6. The thyristor 3 will be turned off when the discharging current increases to overcome the current passed through the thyristor 3 in the forward direction. Thereafter the discharge still continues through the diode 4 disposed parallel to the thyristor 3. Now the commutation reactor 12 functions to charge the commutation condenser 6 in opposite polarity to the previous case. If the voltage of the supplementary D.C. source 9 is larger than that of the variable D.C. source 1, then the commutation condenser 6 will be charged through a route of supplementary D.C. source 9–diode 10–thyristor 11–commutation reactor 12–commutation condenser 6–diode 4–diode 4–D.C. source 1. According, even when there is no supply of current from the D.C. source 1, the supplementary D.C. source 9 charges the commutation condenser 6, enabling the later described commutation to be carried out all the same.

When the commutation condenser 6 is fully charged in opposite polarity to what is indicated in FIG. 1, the thyristor 11 is naturally extinguished. On the other hand, when the current inverting circuit is loaded by resistance, the load current previously passing through the load circuit 14 stops because the thyristors 3, 8 and 11 are all turned off, with the resultant turn-off of the main thyristors 15 and 18. In this case where the current inverting circuit 14 is loaded by inductance, there will flow a circulatory current through the load circuit 14 in the direction of the indicated dotted line arrow, preventing the main thyristors 15 and 18 from being extinguished. In such case, therefore, the extinction of the main thyristors 15 and 18 is effected in the following manner. Namely, when the thyristor 8 is supplied with ignition signals for conduction after the commutation condenser 6 is fully charged in opposite direction to what is indicated, the charge in the condenser 6 is discharged through a route of commutation condenser 6–commutation reactor 7–thyristor 8–main thyristor 18–diode 21–commutation condenser 6 and another route of commutation condenser 6–commutation reactor 7–thyristor 8–diode 20–main thyristor 15–commutation condenser 6 respectively. The current thus discharged tends to overcome the load current previously travelling through the main thyristors 15 and 18. Thus the load current previously flowing through the main thyristors 15 and 18 decreases until it ceases to flow, preventing said thyristors 15 and 18 from being conducted. In this case the discharged current continues to flow through diodes 20, 19, 22 and 21, so that there occurs a voltage drop in the forward direction of the diodes 19 to 22, back biassing the main thyristors 15 and 18 with their resultant turn-off. At this time the condenser 6 is temporarily charged in indicated polarity by the action of the reactor 7. Upon completion of charging, the commutation thyristor 8 is naturally extinguished.

Next when the thyristors 3 and 8 are supplied with ignition signals for conduction, the condenser 6 is further charged through a route D.C. source 1–thyristor 3–condenser 6–reactor 7–thyristor 8, if the condenser 6 has a lower charged voltage than that of the D.C. source 1. If, at this time, the main thyristors 17 and 16 are supplied with ignition signals for conduction, then there will flow in the load circuit 14 a load current in an opposite direction to that of the indicated arrow. If, under such condition, the thyristor 11 is supplied with ignition signals for conduction, the condenser 6 will release its charge through the same route as described above to obstruct the conduction of the thyristor 3, and then again charged in opposite polarity to what is indicated by the supplementary D.C. source 9. Accordingly, where the load circuit 14 is resistance, the load current flowing therethrough decreases immediately after the thyristor is turned off, and finally stops with the resultant turn-off of the thyristors 17 and 16. In case the load circuit 14 is inductance there will be introduced a circulatory current through a closed circuit of thyristor 17–diode 19 and that of thyristor 16–load circuit 14–diode 22 respectively. In such case, the thyristor 8 is ignited as in the previous case to cause the condenser 6 to discharge a current in an opposite direction to the current travelling through the main thyristors 17 and 16, with their resultant turn-off. The foregoing operation is associated with the case where the commutation D.C. source 1 has a lower voltage than the supplementary D.C. source 9, the waveforms of currents of the respective thyristors being presented in FIGS. 2a to 2g. The aforesaid operation is repeated in the same manner. As mentioned above, the thyristors 3 and 8 are first ignited to charge the condenser 6 with energy supplied by the D.C. source 1. After a specified time, the thyristor 11 and then thyristor 8 are ignited, and approximately at the same time a desired main thyristor is ignited. Then the load circuit 14 is supplied with a single-phase alternating current having a prescribed frequency.

According to this embodiment, the inverter device is so designed as to obtain any desired amount of commutation energy by charging the condenser 6 independently of the voltage of the variable D.C. source 1 due to the installation of a supplementary D.C. source 9 for exclusive use in commutation. Accordingly, it is possible to obtain sufficient commutation energy, though the condenser 6 may have a relatively small capacity and in consequence to elevate commutation efficiency and markedly to reduce commutation loss at the time of high frequency operation. Further, an oscillating current discharged from a commutation circuit consisting of the condenser 6 and reactors 7 and 12 does not directly travel through the main thyristors as is the case with the prior art device, so that the main thyristors are not required to be large in current capacity, with the resultant reduction in cost. Also the fact that commutation energy is obtained regardless of the voltage of the variable D.C. source 1 enables the low voltage operation of an inverter device or control of voltage by varying the source voltage to be freely carried out. Accordingly, the inverter device of the present invention is best adapted to be used in a power source for variable speed control of an A.C. motor which requires frequency and voltage to be controlled over a particularly broad range.

Figure 3A:
Figure 3B:
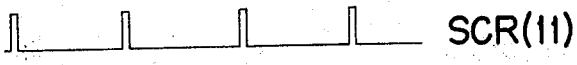
Figure 3C:
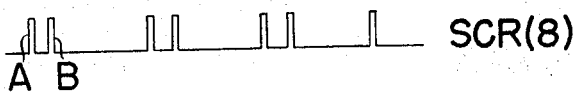
Figure 4A:
Figure 4B:
Figure 4C:
Figure 4D:
Figure 4E:
Figure 4F:
Figure 4G:

The foregoing description relates to the case where the variable power source 1 has a lower voltage than the supplementary power source 9. However, the circuit arrangement of the present invention is also effectively applicable in the case where both power sources 1 and 9 have substantially the same voltage. The waveforms of currents of the thyristors 3, 11 and 8 used in the latter case are presented in FIGS. 3a to 3c. The waveforms of currents of the main thyristors 17 to 20 are the same as those of FIGS. 2d to 2g and so they are not indicated. In the latter case, only gate signals supplied to the thyristor 8 present different waveforms. After the thyristor 3 is turned off due to the conduction of the thyristor 11, the condenser is charged in opposite polarity to that indicated, and then the thyristor 8 is supplied with the first gate signal A to cause the condenser 6 to release its stored energy. The main thyristors 15 and 18 will be turned off. Next, the second gate signal B is supplied to the thyristor 8 to charge the condenser 6 in the polarity indicated, using the D.C. source 1 causing thyristor 3 to turn on.

Viewed the other way, the foregoing description is associated with the case where the load circuit 14 undergoes a fully large inductive load. However, where the induction load is small, there will flow a low current to the condenser 6 through the thyristor 11, since the load current flowing through the thyristor 3 is low, thus bringing about a result insufficient to cause the large commutating current to flow through the main thyristors 15–18 in the opposite directions thereof. In such case, the thyristor 11 is preferably turned on first to turn off the thyristor 3 as shown in FIGS. 4a to 4g. The turn-off of the thyristor 3 also turns off said thyristor 11 by a feed back process. When the thyristor 11 is again turned on, gate signals are supplied to the main thyristors 15 to 18 for their conduction so as to instantly charge the condenser 6 in opposite polarity to that indicated, the capacitor 6 being charged up through the supplementary source 9, thyristor 11, and thyristors 15–18. Next the thyristor 8 is turned on to turn off all the main thyristors 15 to 18, bringing the inverter device back to a normal operating condition. Then the desired one of the main thyristors 15 to 18 is turned on to introduce an electric current through the load circuit 14. The subsequent steps of operation are carried out in the same manner as previously described.

Figure 5:
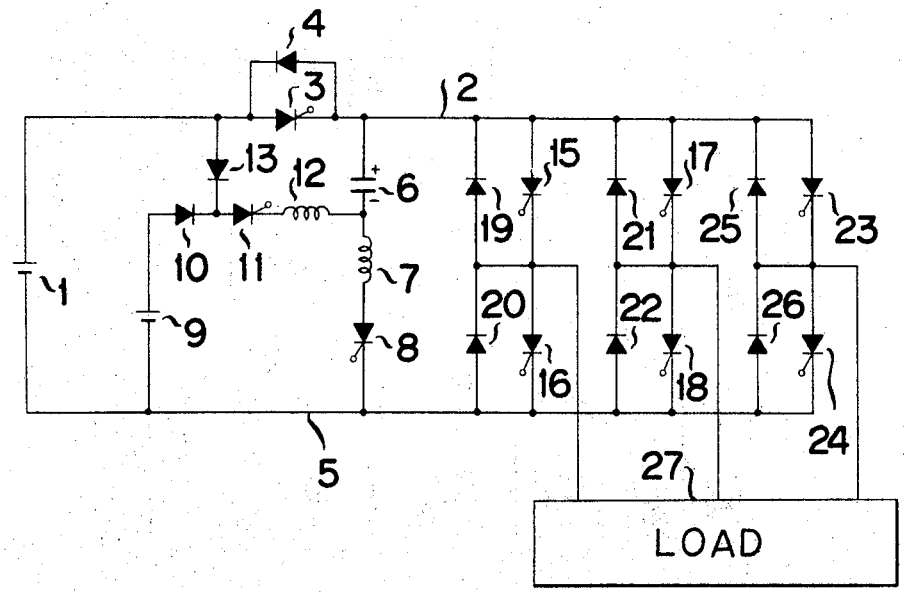
FIG. 5 is a circuit diagram of a 3-phase inverter involving the device of FIG. 1.

It will be apparent that the use of the present invention is not limited to a single-phase inverter, but that it may also be applicable to a multiphase, for example, a 3-phase inverter shown in FIG. 5. Referring to this figure, there is connected between the buses bearing the same numerals of 2 and 5 as in FIG. 1 a series circuit comprising main thyristors 23 and 24 of indicated polarity. To said thyristors 23 and 24 are connected diodes 25 and 26 in inverse parallel relationship, and the common contact of the thyristors 23 and 24 is connected to a 3-phase load circuit 27. The thyristors 15 to 24 are supplied with ignition signals in a prescribed order for each electrical angle of 60° so as to maintain a conduction angle of 120°. Also in this case, the commutation circuit performs the same operation as previously described, and will display the same effect when employed in a 3-phase inverter. Further, the invention can be practised in various modifications without charging the object thereof. For instance, the reactor 7 may be allowed concurrently to act as the reactor 12 of FIG. 1. Also, the supplementary commutation D.C. source 9 may be fitted to an inverter device by connecting the cathode side of said source to the anode side of the variable D.C. source 1. Further, there may be formed on the side of the negative source bus 5 an inverse parallel circuit consisting of the thyristor 3 and diode 4. The commutation condenser 6, commutation reactor 7 and commutation thyristor 8 may be connected in an opposite order to jointly connect the anodes of the commutation power source 9 and variable power source 1, and the cathode of the commutation power source 9 may be connected to the cathode side of the variable power source 1 through the diodes 13 and 10 whose polarity was turned opposite, causing the polarity of the thyristor 11 to be also turned opposite. The foregoing arrangement can still bring about as good results as described above. If necessary, it is also possible to set up an impedance means between the diode 10 and thyristor 11 so as to prevent the condenser 6 from being charged to an excessive voltage.

The aforementioned arrangement eliminates the shorting of a commutation reactor which unavoidably occurs at the time of commutation by the prior art device, and causes the condenser 6 which was discharged through the commutation thyristor 8 to be charged again in opposite polarity to that indicated and said charge to be accumulated in the condenser 6 through the feed back diodes 19 and 22 in the same polarity as that indicated. Accordingly, commutation loss is limited to that resulting from the resistance of the commutation circuit, thus reducing said loss to a far greater extent than is possible with the conventional apparatus. Therefore, the condenser 6 only requires its charge to be supplemented with a very small amount of power by the variable power source 1, substantially saving power requirement. Further according to the present invention, an oscillating current discharged from a commutation circuit consisting of the condenser 6 and reactor 7, etc. does not directly pass through the main thyristors as is the case with the prior art device, so that they are not required to have a high withstand voltage, with the resultant reduction in cost.

Figure 6:
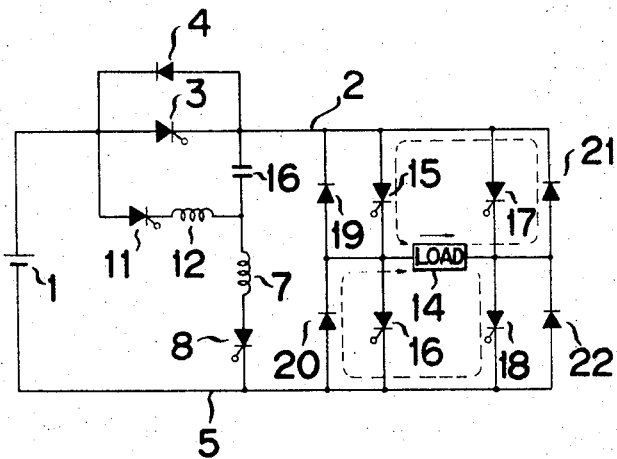
FIG. 6 is a circuit diagram of an inverter device according to another embodiment of the invention.

The aforementioned embodiment used a supplementary power source 9 to minimise the required capacity of the commutation condenser 6. However, if the D.C. power source 1 is of constant voltage, said supplementary power source 9 may be omitted to simplify the circuit arrangement, the object of the present invention will not be affected thereby. FIG. 6 represents an inverter device formed by removing only the supplementary power source 9 and diodes 10 and 13 from the circuit of the embodiment shown in FIG. 1. The other parts of FIG. 6 and their functions are substantially the same as in the embodiment of FIG. 1, and are denoted by the same numerals as those of FIG. 1, description thereof being omitted and only the waveforms of currents of the thyristors 3, 8 and 11 and main thyristors 15 to 18 being presented in FIGS. 7a to 7g.

FIG. 8 represents the case where the circuit of FIG. 6 is applied in a 3-phase apparatus. Since the members involved in said circuit have substantially the same function as those of FIG. 5, they are denoted by the same numerals and description thereof is omitted.

Figure 9:
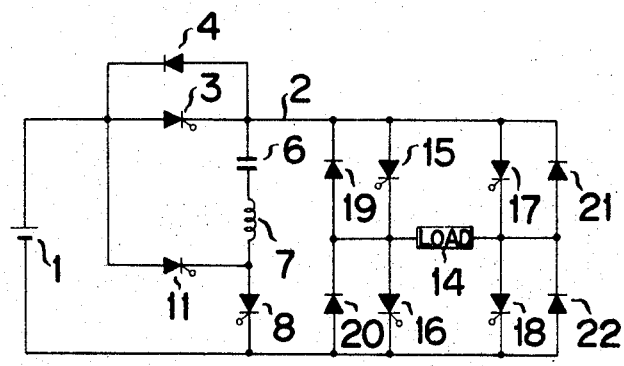
FIG. 9 is a circuit diagram of an inverter device according to still another embodiment of the invention.
Figure 10:
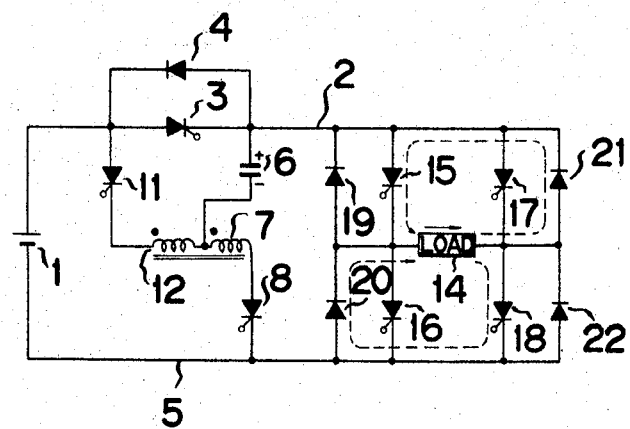
FIG. 10 is a circuit diagram of an inverter device according to still further embodiment of the invention.

The present invention is not limited to the aforementioned embodiments, but may be practised in other modifications. For example, it is possible to remove the reactor 12 shown in FIG. 9 and connect the cathode of the thyristor 11 to the anode of the thyristor 8 so as to allow the reactor 7 concurrently to act as the reactor 12.

There will now be described the embodiment of FIG.

9. The main thyristors 15 to 18 are extinguished by the following processes:

(i) The thyristor 3 is extinguished by the ignition of the commutation thyristor 11.

(ii) The condenser 6 is charged in opposite polarity and the thyristor 11 is allowed to extinguish itself.

(iii) The main thyristors 15 to 18 are extinguished by the ignition of the thyristor 8.

(iv) The thyristor 3 and main thyristors 15 to 18 are ignited.

The total time requirement T for the processes of (i) to (iv), namely, the time of commutation, may be expressed as below:

T = time $t_1$ of conduction of thyristor 11 + time $2_2$ of turn-off time of the thyristor 11 + time $t_3$ of conduction of thyristor 8.

With an inverter in practical use, for example, $t_1 = 100$ microseconds, $t_2 = 100$ microseconds and $t_3 = 100$ microseconds. Therefore $T = 300$ microseconds. With a 3-phase inverter, commutation is performed 6 times per period. Therefore, with the output frequency of said 3-phase inverter represented by $f$, time requirement for all cycles of commutation occurring per second will be $6fT = 1800 f$ (microseconds). Where it is tried to set the time of each cycle of commutation at less than one-fourth of a unit period, the upper limit to frequency will be $$f = \frac{1}{4} \times \frac{1}{1800} \times 10^6 = 139 \ H_z.$$

Due to such low upper limit to frequency, it will be necessary to use a single-phase inverter, if there is demanded a frequency having a higher upper limit. The embodiment of FIG. 9 allows the time of commutation to be shortened and the upper limit to frequency to be elevated. This embodiment is different from the aforementioned ones in that in substitution for the commutation reactor 7, the reactors 7 and 12 are closely coupled with each other in the same polarity as indicated.

Let it be assumed that while the thyristor 11 is turned on, the thyristor 8 is also turned on by ignition signals and at this time the charge of the commutation condenser 6 has an opposite polarity to that indicated and attains a voltage of $E_c$. Then due to the close coupling of the reactor 7 with the reactor 12, the turn-on of the thyristor 8 causes the thyristor 11 to be turned off, because it receives an inverse voltage of $2E_c - E_d$ (where $E_d$ denotes the voltage of the D.C. source 1), provided $E_c$ is larger than $E_d/2$. The reason why there is required a certain amount of time for the thyristor 11 to attain its fully insulated state after it is once turned off is because said thyristor is necessarily impressed with an inverse voltage. Since the thyristor 8 can be ignited before the thyristor 11 naturally extinguishes itself, the commutation time T becomes shorter than a sum of $t_1$ and $t_2$. Accordingly, the upper limit to frequency can be increased at least 1.5 times over what is possible with the prior art apparatus.

What is claimed is:

1. An inverter device comprising: a D.C. source; a current inverting circuit including a plurality of main thyristors for alternately inverting an electric current supplied by the D.C. source and flowing through a load circuit; and commutation circuit comprising a first thyristor and a first diode connected between the D.C. source and said current inverting circuit in inverse parallel relationship and also comprising a series circuit including a condenser, a first reactor and a second thyristor connected in parallel with the current inverting circuit, and a series circuit including a second reactor and a third thyristor connected in parallel with a series circuit comprised of said first thyristor and said condenser for causing the charge of said condenser to be released through the first thyristor so as to charge again said condenser in opposite polarity to the polarity of said released charge.

2. The inverter device according to claim 1 wherein said first and second reactors are closely coupled with the same polarity.

3. The inverter device according to claim 1 wherein the current inverting circuit is a single-phase circuit consisting of four bridge-connected main thyristors and four diodes respectively connected to the main thyristors in inverse parallel relationship.

4. An inverter device comprising: a D.C. source; a current inverting circuit including a plurality of main thyristors for alternately inverting an electric current supplied by the D.C. source and flowing through a load circuit; and a commutation circuit comprising a first thyristor and a first diode connected between the D.C. source and said current inverting circuit in inverse parallel relationship and also comprising a series circuit including a condenser, a reactor and a second thyristor connected in parallel with the current inverting circuit, and a third thyristor connected in parallel with a series circuit comprised of said first thyristor, said condenser and said reactor for causing the charge of said condenser to be released through the first thyristor so as to charge again said condenser in opposite polarity to the polarity of said released charge.

5. The inverter device according to claim 4 wherein the current inverting circuit is a single-phase circuit consisting of four bridge-connected main thyristors and four diodes respectively connected to the main thyristors in inverse parallel relationship.

6. The inverter device according to claim 2 wherein the current inverting circuit is a single-phase circuit consisting of four bridge-connected main thyristors and four diodes respectively connected to the main thyristors in inverse parallel relationship.

7. The inverter device according to claim 1 wherein said current inverting circuit is a three-phase circuit consisting of three parallel connected groups each of which comprises two main thyristors serially connected in the forward direction of the D.C. source and six diodes respectively connected to each of the thyristors in inverse parallel relationship.

8. The inverter device according to claim 4 wherein said current inverting circuit is a three-phase circuit consisting of three parallel connected groups each of which comprises two main thyristors serially connected in the forward direction of the D.C. source and six diodes respectively conected to each of the thyristors in inverse parallel relationship.

9. The inverter device according to claim 3 wherein said current inverting circuit is a three-phase circuit consisting of three parallel connected groups each of which comprises two main thyristors serially connected in the forward direction of the D.C. source and six diodes respectively connected to each of the thyristors in inverse parallel relationship.

10. The inverter device according to claim 1 wherein the commutation circuit is further provided with a supplementary D.C. source coupled to an anode electrode of said third thyristor to charge the condenser in opposite polarity to that charged by said D.C. source through the second thyristor when the first thyristor is extinguished.

11. The inverter device according to claim 4 wherein the commutation circuit is further provided with a supplementary D.C. source coupled to an anode electrode of said third thyristor to charge the condenser in opposite polarity to that charged by said D.C. source through the second thyristor when the first thyristor is extinguished.

12. The inverter device according to claim 2 wherein the commutation circuit is further provided with a supplementary D.C. source coupled to an anode electrode of said third thyristor to charge the condenser in opposite polarity to that charged by said D.C. source through the second thyristor when the first thyristor is extinguised.

13. The inverter device according to claim 3 wherein the commutation circuit is further provided with a supplementary D.C. source coupled to an anode electrode to charge the condenser in opposite polarity to that charged by said D.C. source through the second thyristor when the first thyristor is extinguished.

14. The inverter device according to claim 7 wherein the commutation circuit is further provided with a supplementary D.C. source coupled to an anode electrode of said third thyristor to charge the condenser in opposite polarity to that charged by said D.C. source through the second thyristor when the first thyristor is extinguished.

15. The inverter device according to claim 14 wherein said commutation circuit comprises a second diode connected in the forward direction between the supplementary D.C. source and second thyristor, and a third diode connected in the forward direction of the second thyristor between the contact point of said second diode with second thyristor and the contact point of the D.C. source with first thyristor.

References Cited
UNITED STATES PATENTS

| | | | |
|---|---|---|---|
| 3,207,974 | 9/1965 | McMurray | 321—45 |
| 3,213,287 | 10/1965 | King. | |
| 3,242,352 | 3/1966 | Long. | |
| 3,303,407 | 2/1967 | Depenbrock et al. | 321—45 |
| 3,321,697 | 5/1967 | Etter | 321—45 |
| 3,388,310 | 6/1968 | Etter | 321—45 XR |

WILLIAM M. SHOOP, JR., Primary Examiner